US007673058B1

(12) United States Patent
White et al.

(10) Patent No.: US 7,673,058 B1
(45) Date of Patent: *Mar. 2, 2010

(54) UNSOLICITED MESSAGE INTERCEPTING COMMUNICATIONS PROCESSOR

(75) Inventors: Richard Paul White, Pacific Grove, CA (US); Alan Huang, Menlo Park, CA (US); Haw-minn Lu, San Diego, CA (US); Ira Victor Spivack, Reno, NV (US)

(73) Assignee: Engate Technology Corporation, Reno, NV (US)

( * ) Notice: Subject to any disclaimer, the term of this patent is extended or adjusted under 35 U.S.C. 154(b) by 1747 days.

This patent is subject to a terminal disclaimer.

(21) Appl. No.: 10/761,894

(22) Filed: Jan. 20, 2004

Related U.S. Application Data

(63) Continuation of application No. 10/238,216, filed on Sep. 9, 2002, now abandoned.

(51) Int. Cl.
*G06F 15/16* (2006.01)
*G06F 15/173* (2006.01)
(52) U.S. Cl. .................... 709/229; 709/225; 709/245
(58) Field of Classification Search ............ 709/225, 709/229, 245
See application file for complete search history.

(56) References Cited

U.S. PATENT DOCUMENTS

| 5,283,856 | A | 2/1994 | Gross et al. |
| 5,377,354 | A | 12/1994 | Scannell et al. |
| 5,619,648 | A | 4/1997 | Canale et al. |
| 5,826,022 | A | 10/1998 | Nielsen |
| 5,999,932 | A | 12/1999 | Paul |
| 6,023,723 | A | 2/2000 | McCormick et al. |
| 6,052,709 | A | 4/2000 | Paul |
| 6,112,227 | A | 8/2000 | Heiner |
| 6,199,102 | B1 | 3/2001 | Cobb |
| 6,226,668 | B1 | 5/2001 | Silverman |
| 6,321,267 | B1 | 11/2001 | Donaldson |
| 6,460,050 | B1 | 10/2002 | Pace et al. |
| 6,650,890 | B1 | 11/2003 | Irlam et al. |
| 6,654,787 | B1 | 11/2003 | Aronson et al. |
| 6,868,498 | B1 | 3/2005 | Katsikas |
| 6,941,348 | B2 | 9/2005 | Petry et al. |

(Continued)

OTHER PUBLICATIONS

Jonathan B. Postel, Simple Mail Transfer Protocol (RFC 821), Aug. 1982, Information Sciences Institute of the University of Southern California.

(Continued)

*Primary Examiner*—Paul H Kang

(57) ABSTRACT

The spam blocker monitors the SMTP/TCP/IP conversation between a sending message transfer agent MTA__0 and a receiving message transfer agent MTA__1; catches MTA__0's IP address IP__0, MTA__0's declared domain D__0, from-address A__0; to-address A__1, and the body of the message; and uses this source and content information to test for unsolicited messages. It interrupts the conversation when MTA__0 sends a .\r\n end-of-message indicator and uses the various test results to decide if the message is suspected of being unsolicited. If the message is suspected of being unsolicited then it logs the rejected message and sends an error reply to MTA__0 which forces MTA__0 to send a QUIT command before the body of the message is transmitted; else it logs the allowed message and releases the intercepted RCPT command which allows the conversation between MTA__0 and MTA__1 to proceed.

18 Claims, 23 Drawing Sheets

U.S. PATENT DOCUMENTS

| | | |
|---|---|---|
| 6,965,919 B1 | 11/2005 | Woods et al. |
| 6,996,606 B2 | 2/2006 | Hasegawa |
| 7,016,939 B1 | 3/2006 | Rothwell et al. |
| 7,146,402 B2 | 12/2006 | Kucherawy |
| 7,249,175 B1 | 7/2007 | Donaldson |
| 2002/0087641 A1 | 7/2002 | Levosky |
| 2002/0091932 A1 | 7/2002 | Shimizu et al. |
| 2002/0162025 A1 | 10/2002 | Sutton et al. |
| 2002/0181703 A1 | 12/2002 | Logan et al. |
| 2002/0199095 A1 | 12/2002 | Bandini et al. |
| 2003/0009698 A1 | 1/2003 | Lindeman et al. |
| 2003/0131063 A1 | 7/2003 | Breck |
| 2003/0167311 A1 | 9/2003 | Kirsch |
| 2003/0187942 A1 | 10/2003 | Quine |
| 2003/0200202 A1 | 10/2003 | Hsiao et al. |
| 2003/0200267 A1 | 10/2003 | Garrigues |
| 2003/0204569 A1 | 10/2003 | Andrews et al. |
| 2003/0220994 A1 | 11/2003 | Zhu |
| 2003/0231207 A1 | 12/2003 | Huang |
| 2004/0015554 A1 | 1/2004 | Wilson |
| 2004/0181571 A1 | 9/2004 | Atkinson et al. |
| 2004/0181585 A1 | 9/2004 | Atkinson et al. |

OTHER PUBLICATIONS

Elisa Batista, When You Send Spam To Yourself, Wired, Jul. 2000.

CONNECTION ESTABLISHMENT
  S: 220
  F: 421

HELO
  S: 250
  E: 500, 501, 504, 421

MAIL
  S: 250
  F: 552, 451, 452
  E: 500, 501, 421

RCPT
  S: 250, 251
  F: 550, 551, 552, 553, 450, 451, 452
  E: 500, 501, 503, 421

DATA
  I: 354 -> data -> S: 250
            F: 552, 554, 451, 452
  F: 451, 554
  E: 500, 501, 503, 421

RSET
  S: 250
  E: 500, 501, 504, 421

SEND
  S: 250
  F: 552, 451, 452
  E: 500, 501, 502, 421

SOML
  S: 250
  F: 552, 451, 452
  E: 500, 501, 502, 421

SAML
  S: 250
  F: 552, 451, 452
  E: 500, 501, 502, 421

VRFY
  S: 250, 251
  F: 550, 551, 553
  E: 500, 501, 502, 504, 421

EXPN
  S: 250
  F: 550
  E: 500, 501, 502, 504, 421

HELP
  S: 211, 214
  E: 500, 501, 502, 504, 421

NOOP
  S: 250
  E: 500, 421

QUIT
  S: 221
  E: 500

TURN
  S: 250
  F: 502
  E: 500, 503

Fig. 3 (prior art)

214 Help message

[Information on how to use the receiver or the meaning of a particular non-standard command;

this reply is useful only to the human user]

220 <domain> Service ready

221 <domain> Service closing transmission channel

250 Requested mail action okay, completed

251 User not local; will forward to <forward-path>

354 Start mail input; end with <CRLF> <CRLF>

421 <domain> Service not available, closing transmission channel

[This may be a reply to any command if the service knows must shut down]

450 Requested mail action not taken: mailbox unavailable [E.g., mailbox busy]

451 Requested action aborted: local error in processing

452 Requested action not taken: insufficient system storage

500 Syntax error, command unrecognized [This may include errors such as command line too long]

501 Syntax error in parameters or arguments

502 Command not implemented

503 Bad sequence of commands

504 Command parameter not implemented

550 Requested action not taken: mailbox unavailable [E.g., mailbox not found, no access]

551 User not local; please try <forward-path>

552 Requested mail action aborted: exceeded storage allocation

553 Requested action not taken: mailbox name not allowed [E.g., mailbox syntax incorrect]

554 Transaction failed

Fig. 4 (prior art)

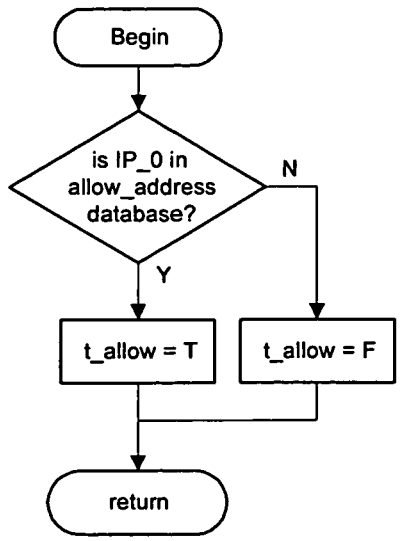
Fig. 12A
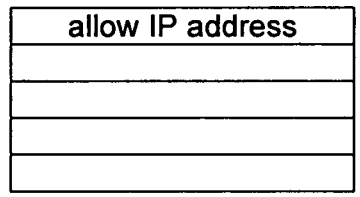
Fig.12B
| | | | |
|---|---|---|---|
| 66.75.160.12 | 65.54.232.7 | 64.4.55.7 | 64.4.50.7 |
| 65.54.254.145 | 64.4.56.135 | 64.4.55.135 | 64.4.49.199 |
| 65.54.232.71 | 64.4.55.71 | 64.4.50.71 | 64.4.49.135 |
Fig. 12C

| low prevent address | high prevent IP address |
|---|---|
|  |  |
|  |  |
|  |  |
|  |  |

| | | | |
|---|---|---|---|
| 4.19.93.159 | 12.237.79.6 | 64.3.236.18 | 66.75.*.* |
| 4.43.46.14 | 61.16.2.72 | 65.171.144.13 | 128.121.16.241 |
| 4.43.46.15 | 63.162.162.157 | 65.174.29.52 | 128.121.16.248 |
| 4.43.46.17 | 63.163.139.83 | 65.211.149.230 | 129.71.235.57 |
| 12.101.140.178 | 64.0.241.210 | 65.88.90.10 | 131.161.40.61 |
| 12.101.199.26 | 64.14.127.28 | 66.115.47.112 | 139.130.177.67 |
| 12.101.61.98 | 64.159.91.198 | 66.115.47.144 | 146.243.16.156 |
| 12.109.16.67 | 64.251.16.152 | 66.123.51.203 | 148.235.134.146 |
| 12.129.205.65 | 64.251.16.153 | 66.47.187.38 | 148.235.89.20 |
| 12.129.205.84 | 64.251.16.154 | 66.74.*.* |  |

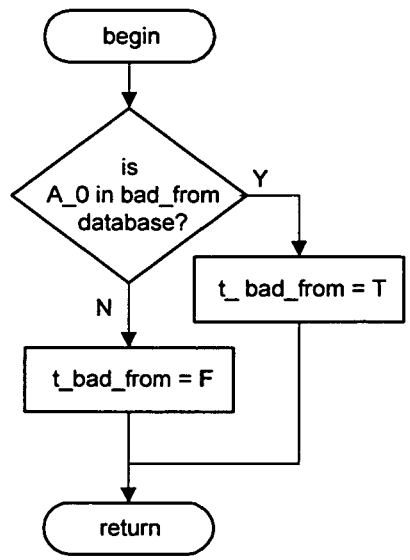
Fig. 16A
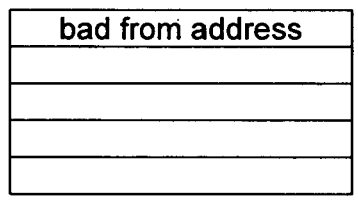
Fig. 16B
| *@*.cl | *@*barota.com | *@*.br |
| *@thejanusgroup.com | *@*.nl | *@*agoramail.net |
| *@*nymphos* | *@netpaloffers.com | ipas@* |
| *@*ramshack.net | *@*.no | *@yourmailsource.com |
| *@freegasdaily.com | *@*porn* | f k*.* |
| *@*emailsvc.net | *@*mercadobr.com | *f k*.* |
| *@*bbwgroup.com | *@*medianetgroup.net | *@*.in |
| *@*hostingcheck.com | *@*myrealbox.com | |
| *@*linksynergy.com | *@*aweber.com | |
Fig. 16C

| time | "To" address (A_1) |
|---|---|
|  |  |
|  |  |
|  |  |
|  |  |

Fig. 23

| time | "To" address (A_1) | "From" address (A_0) | reason for rejection |
|---|---|---|---|
|  |  |  |  |
|  |  |  |  |
|  |  |  |  |
|  |  |  |  |

Fig. 24

UNSOLICITED MESSAGE INTERCEPTING COMMUNICATIONS PROCESSOR

RELATED APPLICATIONS INFORMATION

This application is a continuation of application Ser. No. 10/238,216 entitled "An Unsolicited Message, Intercepting Communications Processor," filed on Sep. 9, 2002, which is incorporated herein by reference in its entirety as if set forth in full.

This invention is related to co-pending applications, application Ser. No. 10/238,812 entitled "An Unsolicited Message Rejecting Communications Processor," filed on Sep. 9, 2002 by the same inventors and application Ser. No. 10/238,076 entitled "An Unsolicited Message Diverting Communications," filed on Sep. 9, 2002 by the same inventors.

BACKGROUND OF THE INVENTION

1. Field of the Inventions

This invention blocks unsolicited e-mail messages, commonly known as SPAM, from a client's e-mail server; while reducing Internet traffic, server to client traffic, and local storage.

2. Background Information

E-mail has become an important means of communications. Unfortunately, unsolicited e-mail messages, commonly referred to as SPAM, is cluttering this communications channel. This unsolicited e-mail wastes Internet bandwidth, local area network bandwidth, and storage. This translates into lost productivity, increased computing, and increased communication costs. Some of this unsolicited e-mail is also offensive and inappropriate for non-adult audiences.

The spammer collects a list of e-mail address, append these addresses to their message, and queues these messages on their e-mail server (message transfer agent), 2, in FIG. 1. He then connects their e-mail server to the Internet, 1, via in a rogue Internet service provider, a dial-up connection, a digital scriber loop (DSL) connection, or a cable modem connection and sends out their message to the gateway message transfer agents, 5, associated with each e-mail address. These gateway message transfer agent either stores the message in the e-mail mailbox associated with the client, 3, or forwards the message to a another message transfer agent (MTA) on the same local area network.

There are four basic approaches to trying to detect junk e-mail messages. One approach used a community set of rules to determine whether or not a message is spam. This approach is used in Razor, an open source Linux solution, and by companies such as CloudMark (based on Razor) and SpamNet. The problem is getting the user community to agree on a common set of rules.

A second approach uses a set of rule base filters which are periodically updated by the provider and downloaded by the client to determine whether or not a message is spam. The problem is that the set of rules have to be updated and downloaded periodically.

A third approach uses a set of permissions to determine whether or not a message is spam. The problem is that it is not possible for somebody not on the user's permission list to send a message to the user.

A fourth approach uses a "whitelist" and a "blacklist" to determine whether or not a message is spam. The problem is that the spammers are constantly changing their return address and declared domain names.

There are three basic ways of implementing these approaches. One implementation approach is in the Message transfer agent. This approach add some rules to the MTA. The problem is that the MTA program is complicated and inflexible. This limits the kind of rules that can be implemented.

A second implementation approach involves placing the filters between the e-mail client and the Message Transfer Agent. The problem is that some of the information which can be used to help determine whether or not a message is spam is lost or buried.

A third implementation approach involves adding some filters to the e-mail client, Mail User Agent (MUA). The problem is that the e-mail client add-in interface is not an open standard. This leads to compatibility problems.

A problem with these approaches is that they are "reactive." The spam has already been received by the server and relayed via a local area network to client's computer. The spam message has already consumed the server's Internet bandwidth, local area network bandwidth, and client storage.

Another problem with these approaches is that they based on the from-address, subject line, or content of the message; all of which are easy to forge or change.

OBJECTS AND ADVANTAGES

Accordingly, the several objects and advantages of my invention are:

a) to provide a procedure which eliminates unsolicited messages from, a client's e-mail mailbox;

b) to provide a procedure which reduces the amount of communications bandwidth between a client's message transfer agent and mail user agent consumed by unsolicited messages;

c) to provide a procedure which reduces the amount of storage consumed by unsolicited messages;

d) to provide a procedure which uses information which can not be forged to improve, the ability to block unsolicited messages;

e) to provide a procedure which avoids the need for users to install software on their individual system;

f) to provide a procedure which eliminates any need to change the client's current message transfer agent;

g) to provide a procedure which logs the messages which have been allowed;

h) to provide a procedure which fogs the messages which have been rejected;

i) to provide a procedure which allows users to select the ability to not block unsolicited messages;

j) to provide a procedure which allows users to select the ability to block unsolicited messages;

k) to provide a procedure which gives feedback to the sender of a blocked message;

l) to provide a procedure for intercepting unsolicited messages which is failsafe; and m) to provide a procedure for intercepting unsolicited messages which is scalable.

Further objects and advantages of our invention will become apparent from a consideration of the drawings and ensuing description.

SUMMARY OF THE INVENTION

The spam blocker monitors the SMTP/TCP/IP conversation between a sending message transfer agent MTA_0 and a receiving message transfer agent MTA_1 and catches the IP address IP_0 of MTA_0; the declared domain D_0 of MTA_0; the from-address A_0; and the to-address A_1.

The spam blocker uses the captured information to run various source and content based tests. IP_0 is used to query a DNS server for the real domain name DD_0. DD_0 is tested to see if it is "no name." IP_0 is tested to see if it is in a open relay database. IP_0 is tested to see if it is not in a allow_address database. IP_0 is tested to see if it is in a prevent_address database. DD_0 and MTA_1's domain name D_1 are tested to see if they match. D_0 is tested to see if it does not match DD_0 and if D_0 is in the suspect_domain database. A_0 is tested to see if any portion of it is in the bad_from database. The domain of A_0 is tested to see if does not match DD_0 and if it is in the suspect_domain database. A_1 is tested to see if it is in the no_filter database. A_1 is tested to see if it is not in the yes filter database. A_1 is tested to see if it matches A_0.

The spam blocker interrupts the conversation between MTA_0 and MTA_1 when MTA_0 sends a .\r\n end-of-message indicator and uses the results of the various tests to decide if the message is suspected of being unsolicited. If the message is suspected of being unsolicited then the spam blocker logs the rejected message in a rejected_connection database, sends a permanent negative completion reply to MTA_0 which forces MTA_0 to QUIT the connection; else the spam blocker logs the allowed message in the allowed_connection database and releases the intercepted .\r\n end-of-message body indicator to MTA_1 which allows the conversation between MTA_0 and MTA_1 to proceed.

BRIEF DESCRIPTION OF THE DRAWINGS

FIG. 3 (prior art) shows a list of simple mail transfer protocol (SMTP) commands and their associated reply codes.

FIG. 4 (prior art) shows a list of simple mail transfer protocol (SMPT) reply codes and what they mean.

FIG. 12A shows a flowchart for the allow_address test which checks if the IP address IP_0 of the transmitting message transfer agent is in the allow_address database.

FIG. 12B shows the data structure of the allow_address database which stores the IP address of trusted message transfer agents.

FIG. 12C shows a sample of the contents of the allow_address database.

FIG. 16A shows a flowchart for the bad_from test which checks if any portion of the from-address is in the bad_from database.

FIG. 16B shows the data structure of the bad_from database which stores some portions of commonly used from-addresses used by spammers.

FIG. 16C shows a sample of the contents of the bad_from database.

FIG. 23 shows the data structure of the completed_connection database which stores the time and to-address A_1 of the message.

FIG. 24 shows the data structure of the rejected_connection database which stores the time, to-address A_1, from-address A_0, and a code which indicates the reason that the connection was rejected.

DESCRIPTION OF INVENTION

Figure 2:
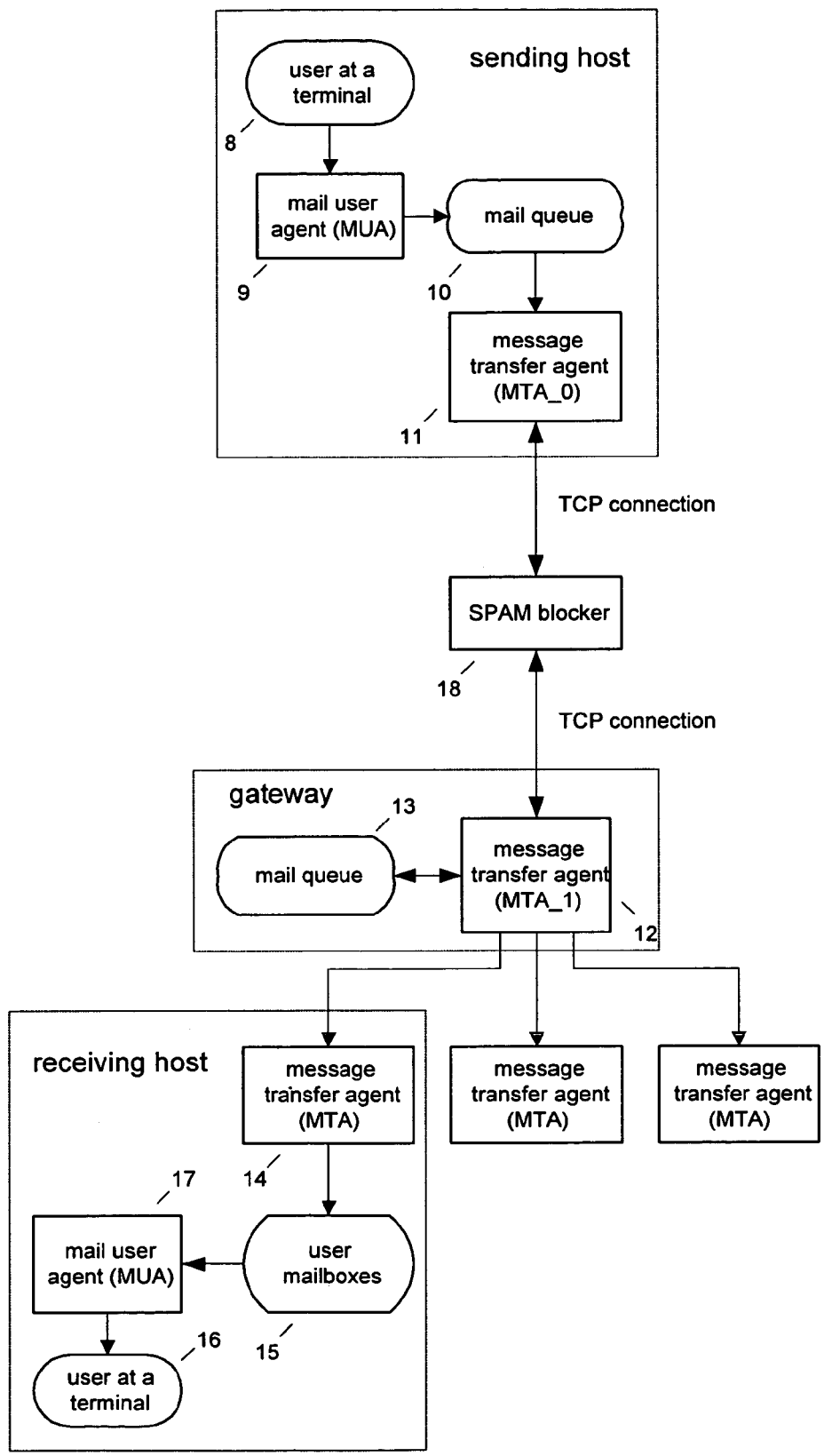
FIG. 2 shows a block diagram of a typical e-mail transfer between sending user 8, sending mail user agent 9, sending message transfer agent 11, a spam blocker 18, a receiving message transfer agent 12, a receiving local message transfer agent 14, receiving mail user agent 16, and receiving user 16.

In overview a user, 8, in FIG. 2, sits at a terminal and types an e-mail message into a mail user agent (MUA), 9, such as Microsoft Outlook Express or Eudora. This mail message is then sent to a mail queue, 10, associated with a message transfer agent (MTA), 11, such as Unix Sendmail. MTA, 11, contacts MTA, 12, associated with the to-address of the mail message and negotiates the transfer of the queued mail message. If the negotiations are completed in a satisfactory manner, the message is transferred and stored in a queue, 13, associated with the gateway MTA, 12. MTA 12 then either stores the mail message in the user's mailbox, 15, or relays the mail message to another MTA, 14, associated with the user. The receiving user, 16, then uses their mail user agent (MUA), 17, to fetch the mail message from their mailbox 15.

The present invention, a spam blocker, 18, in FIG. 2, is inserted between MTA 11 and MTA 12. The spam blocker monitors the conversation between MTA 11 and MTA 12, uses some of the transferred information to decide if the message is spam, and manipulates the conversation if the message is determined to be spam. The spam blocker operates at the SMTP protocol level. This increases the accuracy of spam determination since more information is available. This reduces compatibility issues since SMTP is an established standard and since there are no other in-band or out-of-band communication channels between MTA 11 and MTA 12 to deal with. Operating on the protocol increases the types of responses available for dealing with the unsolicited mail messages.

As mentioned previously, the operations of spam blocker is tightly coupled with the SMTP protocol. The SMTP protocol consists of a set of commands and a set of replies. The set of commands, HELO, MAIL, RCPT, DATA, RSET, SEND, SOML, SAML, VRFY, EXPN, HELP, NOOP, QUIT, and TURN is shown in FIG. 3 (prior art) and the set of replies shown in FIG. 4 (prior art) are detailed in RFC 821 (Postel 1982) and discussed in *TCP/IP Illustrated Volume 1, The Protocols* by W. Richards Stevens (Addison Wesley, ISBN 0-201-63346-9). The possible replies associated with each command are shown in FIG. 3. An "S" class reply indicates a successful completion of the command. An "F" class reply indicates a failure in completion of the command. An "E" class reply indicates an error in the completion of the command. A reply code beginning with a 1, 2, 3, 4, and 5 respectively indicate a positive preliminary reply, a positive completion reply, positive intermediate reply, transient negative completion reply, and permanent negative completion reply. The format of a mail message is specified in RFC 822 (Crocker 1982).

Figure 5:
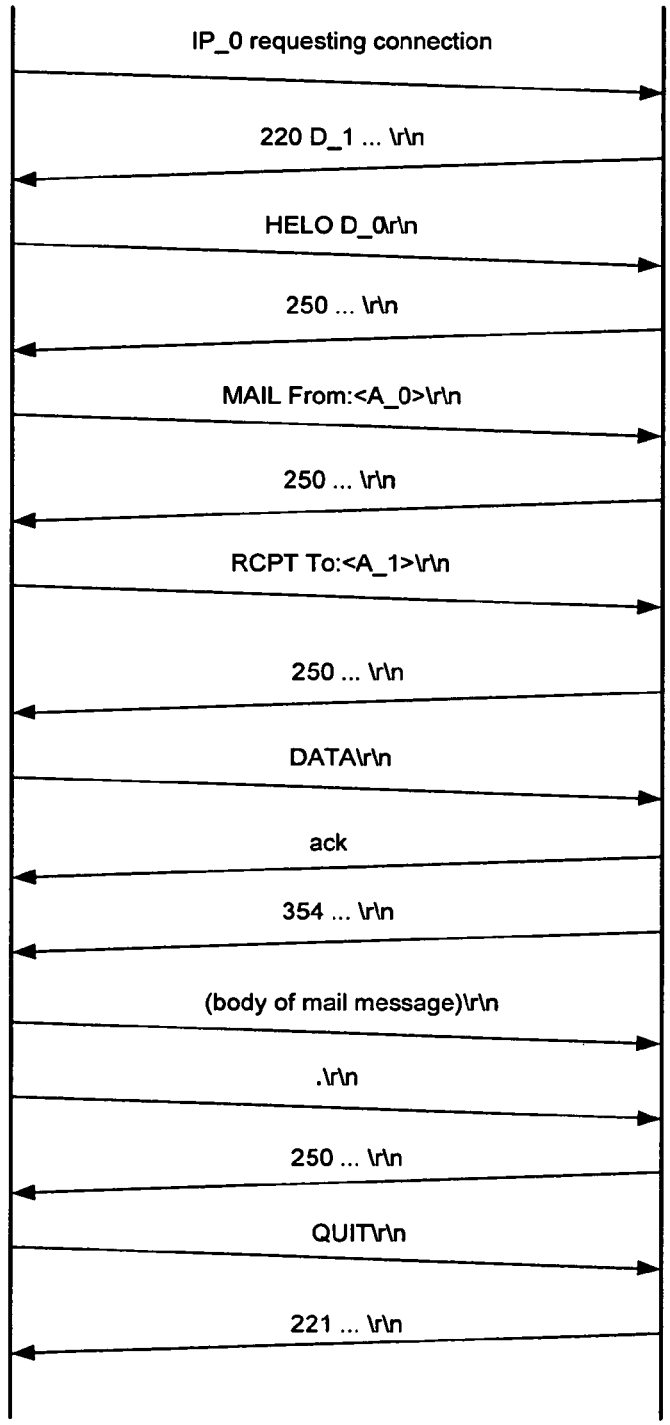
FIG. 5 (prior art) shows a timeline of a typical message transfer using the simple mail transfer protocol (SMTP).

As an example, the time line of a normal mail transfer is shown in FIG. 5 (prior art). For purposes, of explanation, assume that the sending MTA 11 is called MTA_0 and has an IP address of IP_0, a declared domain name of D_0, a real domain name DD_0, and the mail message has a from-address of A_0 and that the receiving MTA 12 is called MTA_1 and has an IP address of IP_1, a domain name of D_1, and it is associated with an user mail address of A_1.

MTA_0 sends a message to MTA_1 requesting to establish a connection. MTA_1 then responds with a 220 rely which includes it's domain name D_1. MTA_0 then sends a HELO command with it's declared domain name D_0. MTA_1 then responds with a 250 reply to acknowledge the successful completion of the HELO command. MTA_0 then sends a MAIL command with a from-address A_0. MTA_1 then sends a 250 to acknowledge the successful completion of the MAIL command. MTA_0 then sends a RCPT command with a message to-address A_1. MTA_1 then sends a 250 reply to acknowledge successful completion of the RCPT command. MTA_0 then sends a DATA command. MTA_1 then sends a 354 reply to acknowledge its ability to receive the data. MTA_0 then sends the data, the body of the message. MTA_0 then sends a .\r\n to indicate the end of the data. MTA_1 then sends a 250 to acknowledge successful transfer of the data. MTA_0 then sends a QUIT command. MTA_1 then sends a 221 to acknowledge the QUIT command and closes down its end of the TCP connection. Upon receipt of the 221 reply, MTA_0 closes down its end of the TCP connection.

As mentioned previously, the present invention, a spam blocker, 18, in FIG. 17, is inserted between MTA_0 and MTA_1. The spam blocker monitors the conversation between MTA 11 and MTA 12, uses some of the transferred information to decide if the message is spam, and manipulates the conversation if the message is determined to be spam. For purposes of illustration, assume that the spam blocker has an IP address of IP_2 and that the MX resource record associated with D_1 has been changed to point to IP address IP_2 instead of IP_1.

Figure 6:
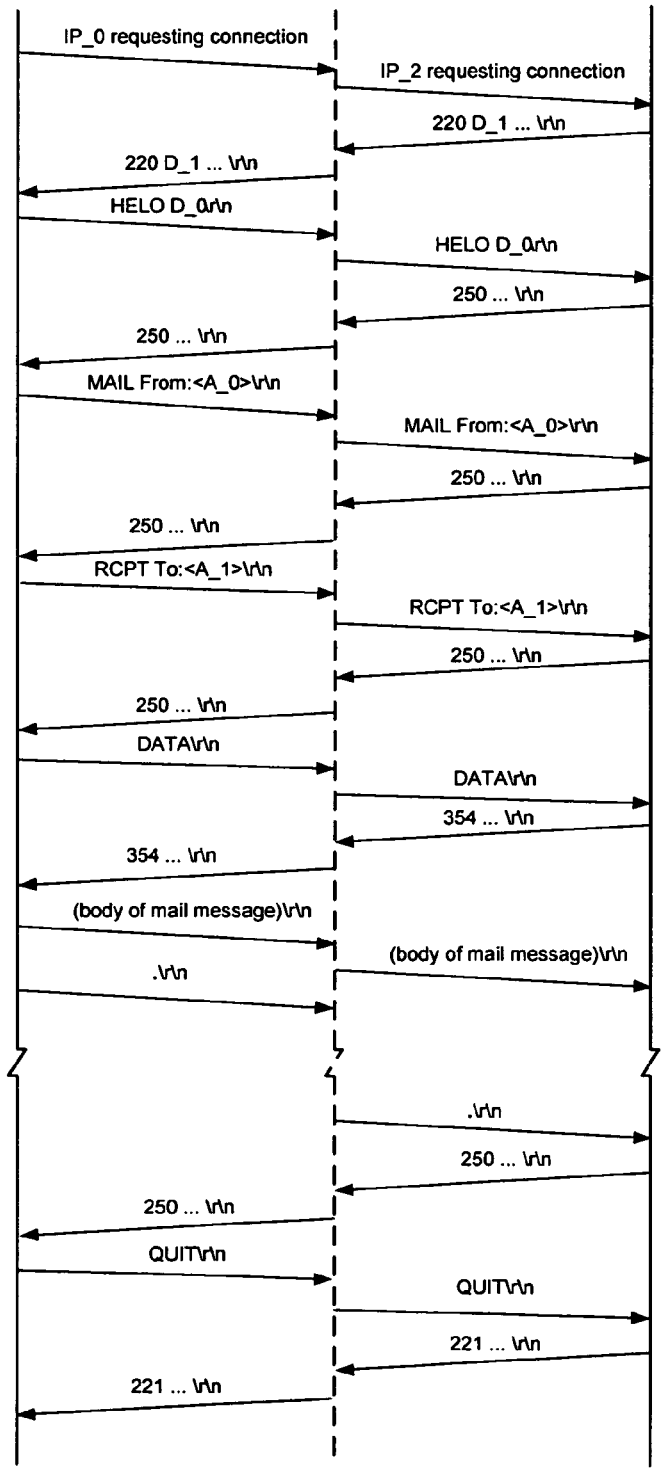
FIG. 6 shows a timeline of a modified version of the simple mail transfer protocol used to reject unsolicited messages in which the message is determined not to be spam.
Figure 7:
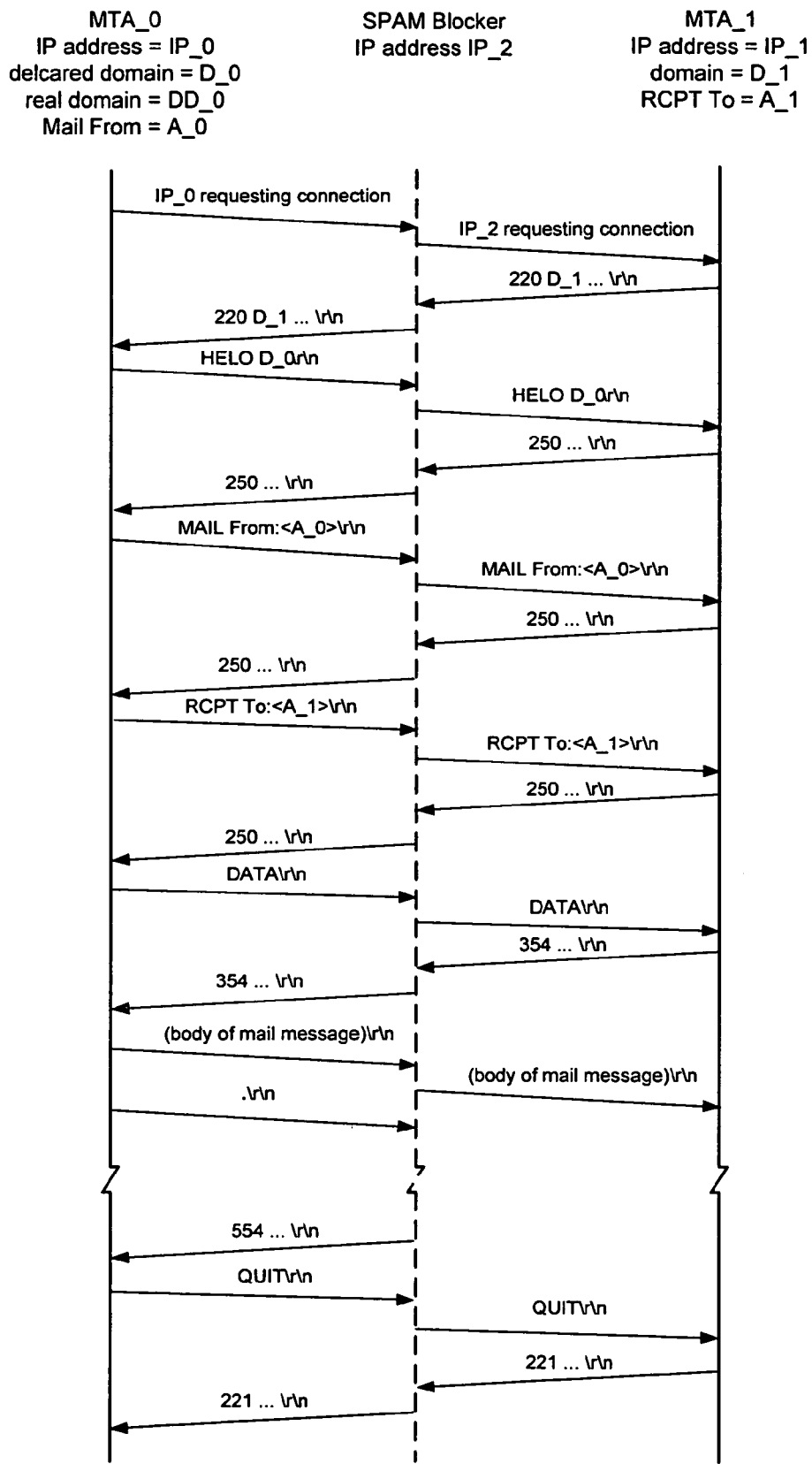
FIG. 7 shows a timeline of a modified version of the simple mail transfer protocol used to reject unsolicited messages in which the message is determined to be spam.

Time lines illustrating the interactions between MTA_0, spam blocker, and MTA_1 are shown in FIG. 6 and FIG. 7. MTA_0 begins by sending a message to D_1 requesting to establish a connection. The MX resource record directs this request to IP_2. The spam blocker at IP_2 notes the IP address IP_0 of MTA_0, relays this request to MTA_1, and performs various spam determining tests based on IP_0. MTA_1 replies with a 220 acknowledgement reply which includes its domain name D_1. The spam blocker relays this acknowledgement to MTA_0. MTA_0 then sends a HELO command which includes declared domain name of D_0. The spam blocker notes declared domain name D_0, relays this command to MTA_1, and performs various source and content spam determining tests based on D_0. MTA_1 replies with a 250 to acknowledge successful completion of the HELO command. The spam blocker relays this reply to MTA_0. MTA_0 then sends a MAIL command which includes from-address A_0. The spam blocker notes from-address A_0, relays this command to MTA_1, and performs various source and content spam determining tests based on A_0. MTA_1 replies with a 250 to acknowledge successful completion of the MAIL command. The spam blocker relays this reply to MTA_0. MTA_0 then sends a RCPT command which includes to-address A_1. The spam blocker notes A_1 and performs various source and content spam determining tests based on A_1. MTA_1 replies with a 250 to acknowledge successful completion of the RCPT command. The spam blocker relays this reply to MTA_0. MTA_0 sends a DATA command. The spam blocker relays the DATA command to MTA_1. MTA_1 replies with a 354 reply to acknowledge receiving the DATA command. The spam blocker relays the 356 command to MTA_0. MTA_0 sends the body of the message. The spam blocker relays the body of the message to MTA_1. MTA_0 sends a .\r\n end of message indicator. The spam blocker then performs various content based tests on the body of the message. The spam blocker then evaluates the results of the various source and content based spam determining tests to determine whether or not the message is suspected of being spam.

If the message is not suspected of being spam then the interactions between MTA_0, spam blocker, and MTA_1 proceed as shown in FIG. 6. The spam blocker relays the .\r\n end-of-message indicator to MTA_1. MTA_1 replies with a 250 to acknowledge receiving the end of message indicator. The spam blocker relays the 250 reply to MTA_0. MTA_0 then sends a QUIT command. The spam blocker relays the QUIT command to MTA_1. MTA_1 replies with a 221 reply to acknowledge the QUIT command and closes down its end of the TCP connection. The spam blocker relays the 221 reply to MTA_0 and closes down its end of the TCP connection with MTA_1 and MTA_0. Upon receiving the 221 reply, MTA_0 closes down its end of the TCP connection.

If the message is suspected of being spam then the interactions between MTA_0, spam blocker, and MTA_1 proceed as shown in FIG. 7. The spam blocker sends a 554 error reply to MTA_0. MTA_0 sends a QUIT command. The spam blocker relays the QUIT command to MTA_1. MTA_1 replies with a 221 reply to acknowledge the QUIT command and closes down its end of the TCP connection. The spam blocker relays the 221 reply to MTA_0 and closes down its end of the TCP connection with MTA_1 and MTA_0. Upon receiving the 221 reply, MTA_0 closes down its end of the TCP connection.

It should be noted that in the case where the message is determined not to be spam, the interactions between MTA_0 and MTA_1 as shown in FIG. 6 are functionally equivalent to the normal interactions between MTA_0 and MTA_1 as shown in FIG. 3 (prior art). This improves compatibility. It should be noted that until receipt of the .\r\n end-of-message indicator by the spam blocker, MTA_1 has full control of the replies to MTA_0's commands. This also improves compatibility.

Figure 8A:
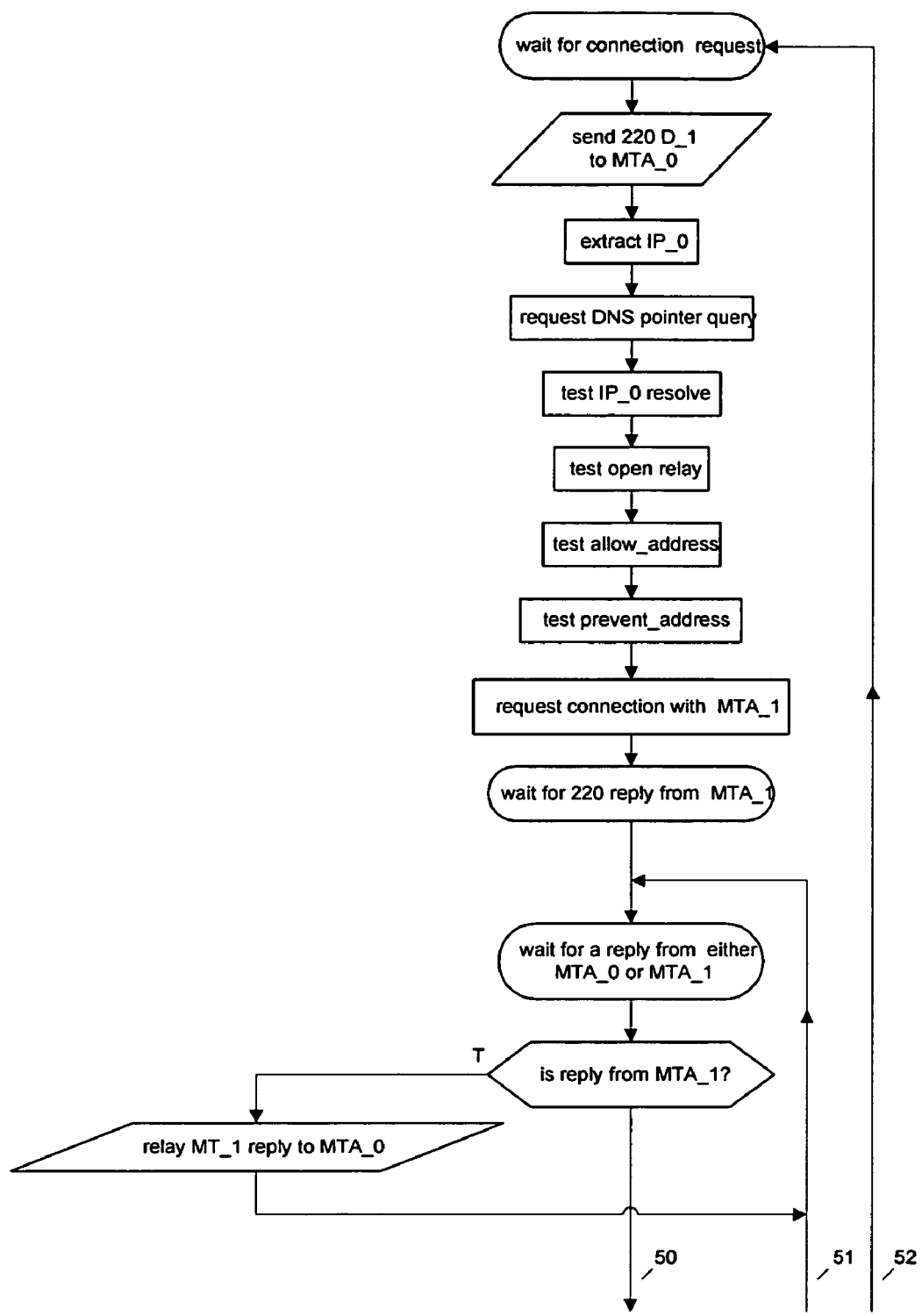
FIG. 8A-8E shows a flowchart of the spam blocking algorithm used to reject unsolicited messages.
Figure 8B:
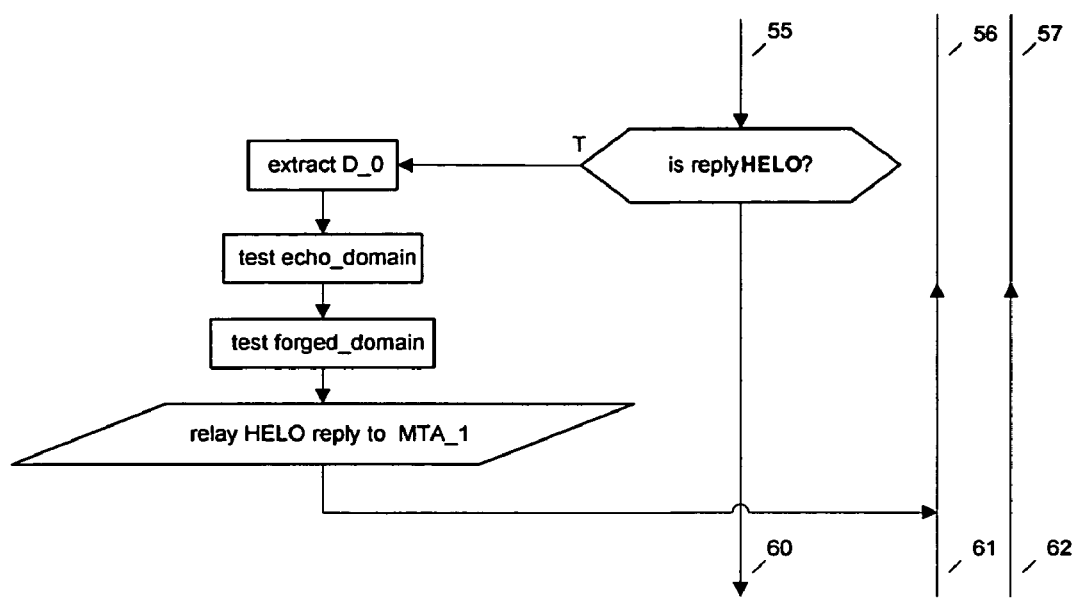
Figure 8C:
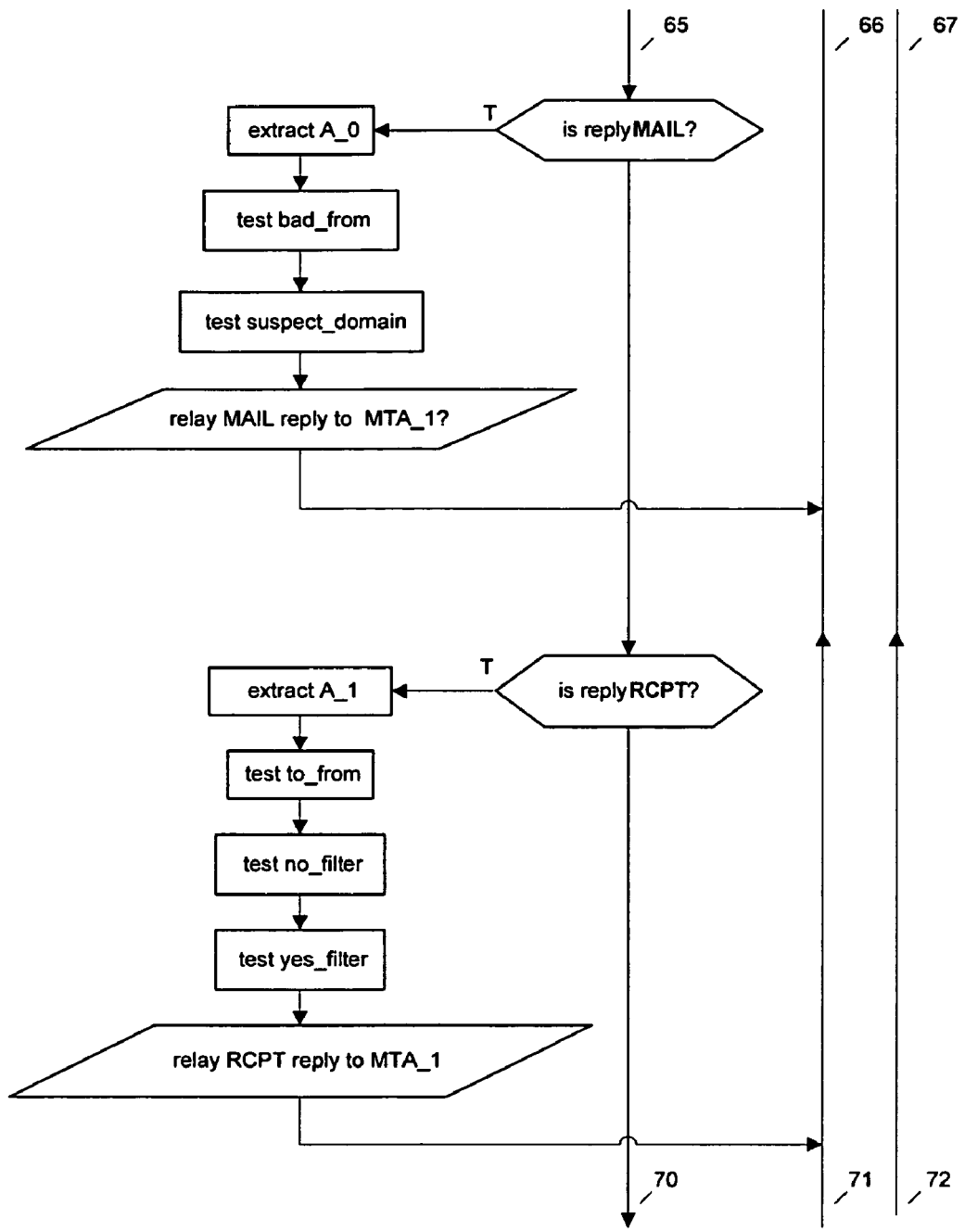
Figure 8D:
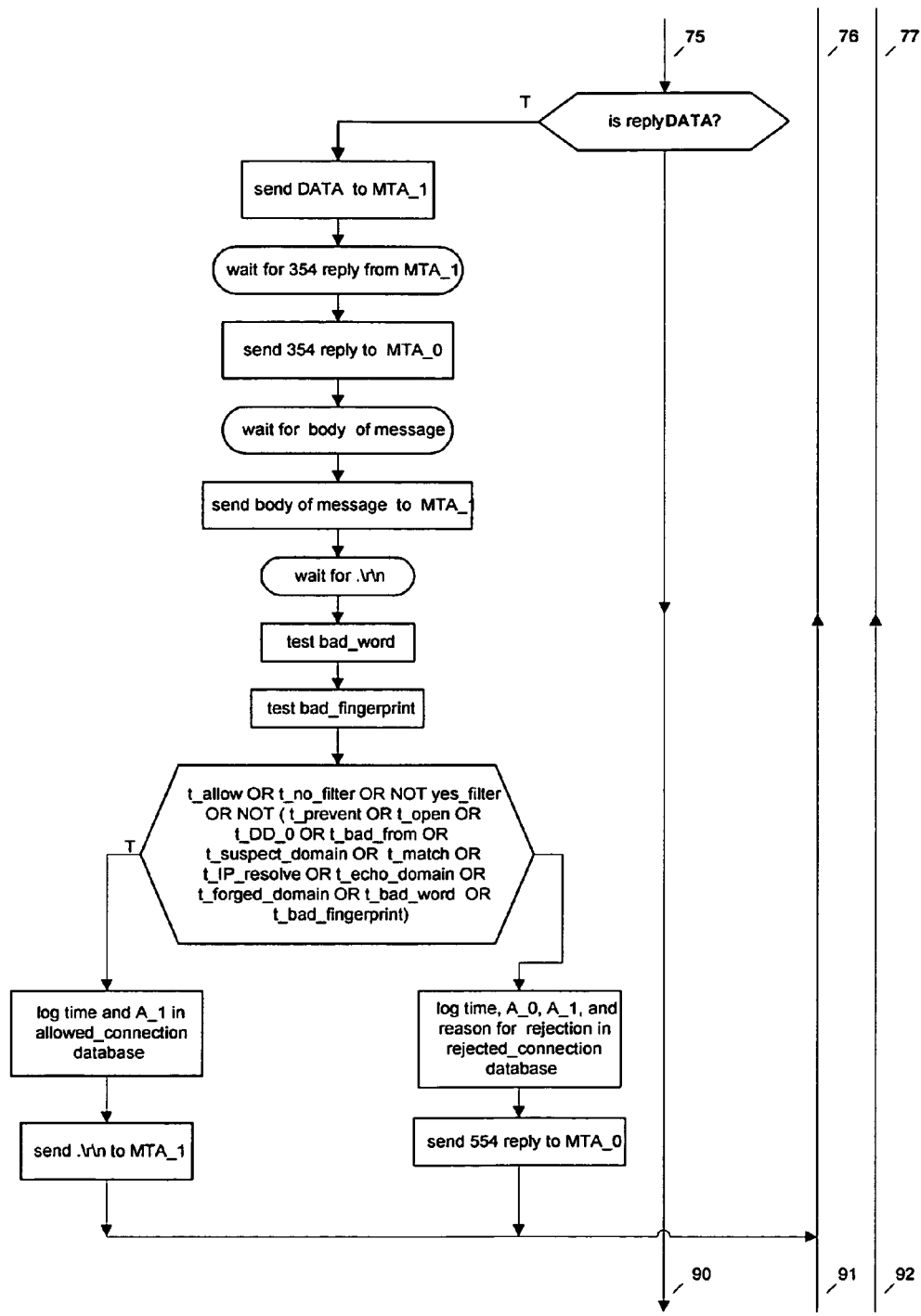

The algorithm which implements the spam blocker is shown in FIGS. 8A, 8B, 8C, 8D, and 8E. Connections 50, 51, and 52 in FIG. 8A are respectively connected to connections 55, 56, and 57 in FIG. 8B. Connections 60, 61, and 62 in FIG. 8B are respectively connected to connections 65, 66, and 67 in FIG. 8C. Connections 70, 71, and 72 in FIG. 8C are respectively connected to connections 75, 76, and 77 in FIG. 8D. Connections 90, 91, and 92 in FIG. 8D are respectively connected to connections 95, 96, and 97 in FIG. 8E.

The algorithm begins in FIG. 8A by waiting for a connection establishment request. Upon receipt of such a request it extracts MTA_0's IP address IP_0. It then sends a 220 reply with a D_1 domain name to MTA_0. It then requests a domain name server (DNS) pointer query. It performs a IP_0_resolve test, an open relay test, an allow_address, and a prevent_address test. It then requests a connection with MTA_1 and waits for a 220 reply from MTA_1. It then waits for a reply from either MTA_0 or MTA_1. It should be noted that IP_0 is an important address since it cannot be forged. If IP_0 is forged then MTA_0 will not receive the 220 reply and the requested connection can not be established.

If the reply is from MTA_1 it relays the reply to MTA_0 and waits for another reply.

If the reply is a HELO command as shown in FIG. 8B then the algorithm extracts MTA_0's declared domain D_0. It then performs an echo_domain and forged_domain tests. It then relays the HELO reply to MTA_1 and waits for another reply.

If the reply is a MAIL command as shown in FIG. 8C then the algorithm extracts from-address A_0. The algorithm then performs the bad_from and the suspect_domain tests. It then relays the MAIL command to MTA_1 and waits for another reply.

If the reply is a RCPT command as shown in FIG. 8C then the algorithm extracts to-address A_1. It then performs the no_filter, the yes_filter, and the to_from tests. It then relays the RCPT command to MTA_1 and waits for another reply.

If the reply is a DATA command as shown in FIG. 8D the algorithm sends the DATA command to MTA_1, waits for a 354 reply from MTA_1, relays the 354 reply to MTA_0, waits for the body of the message, relays the body of the message to MTA_1, and waits for .\r\n end-of-message indicator from MTA_0. The algorithm then performs the bad_word and the bad_fingerprint tests on the body of the message. It then uses the results of the various test to determine if the message is suspected of being spam. In this version of the algorithm the decision equation used is t_allow OR t_no_filter OR NOT t_yes_filter OR NOT (t_prevent OR t_open OR t_IP_resolve OR t_bad_from OR t_suspect_domain OR t_to_from OR t_echo_domain OR t_forged_domain OR t_bad_word OR t_bad_fingerprint).

If the decision equation is true then the message is allowed and the time and to-address is logged in the allowed_connection database. The structure of the allow_connection database is shown in FIG. 21. It is anticipated that this database will be used for statistical and billing purposes. The from-address A_0 could be included if privacy issues are not of concern. It then relays the .\r\n end-of-message indicator to MTA_1 and waits for a new reply.

If the decision equation is determined to be false then the message is not allowed and the time, from-address A_0, to-address A_1, and a reason for the rejection are logged in a rejected_connection database. The data structure of the rejected_connection database is shown in FIG. 22. It is anticipated that this database will be used for statistical and billing purposes. The algorithm then sends a 554 error reply to MTA_0 and waits for a new reply.

Figure 8E:
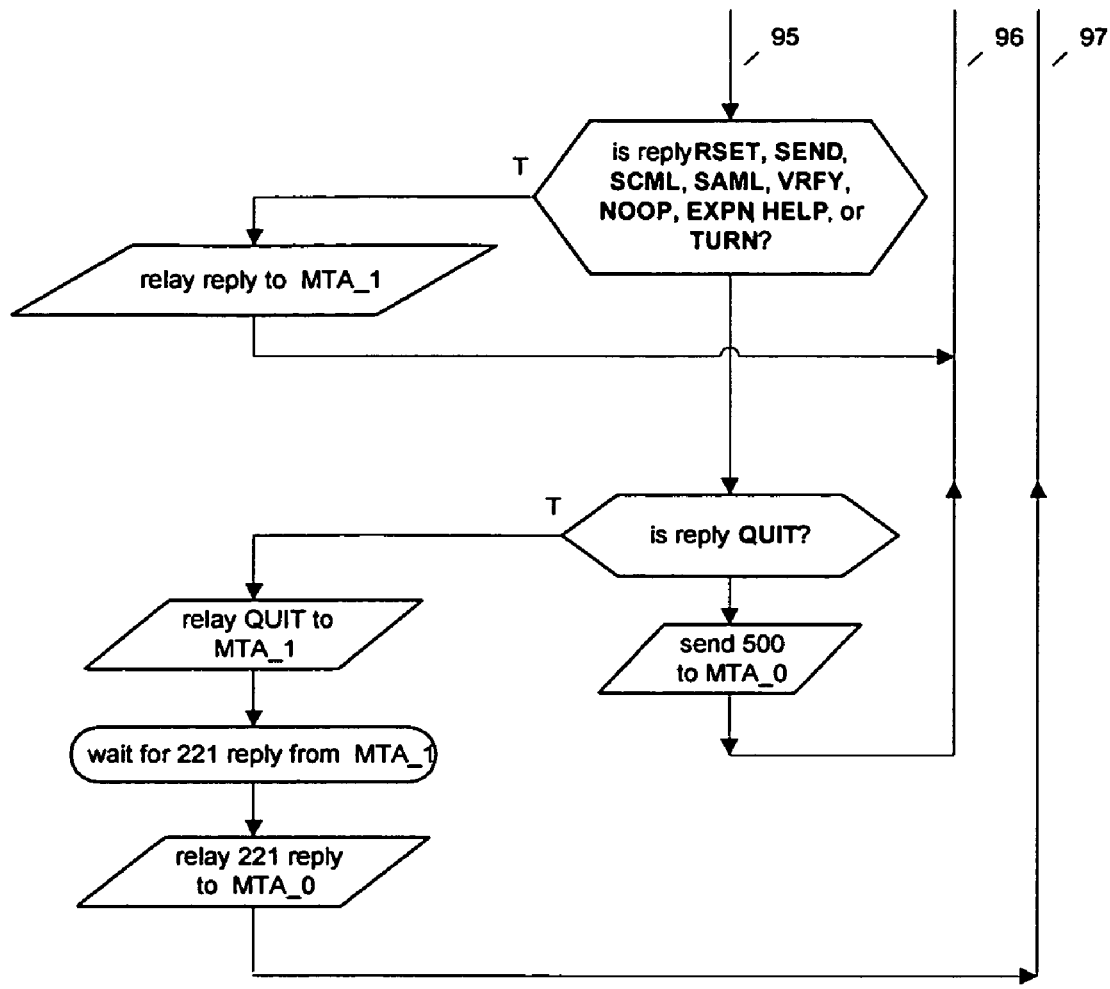

If the reply is a RSET, SEND, SOML, SAML, VRFY, NOOP, EXPN, HELP, or TURN command as shown in FIG. 8E then the algorithm relays the reply to MTA_1 and waits for a new reply.

If the reply is a QUIT command as shown in FIG. 8E then the algorithm relays the QUIT command to MTA_1, waits for a 221 reply from MTA_1 to acknowledge the QUIT command, and relays the 221 reply to MTA_0. It then closes down its end of the TCP connection with both MTA_1 and MTA_0 and waits for a new connection request.

If the reply is not a QUIT command then this is invalid command error and the algorithm sends a 500 to MTA_0 and waits for a new reply.

Figure 9:
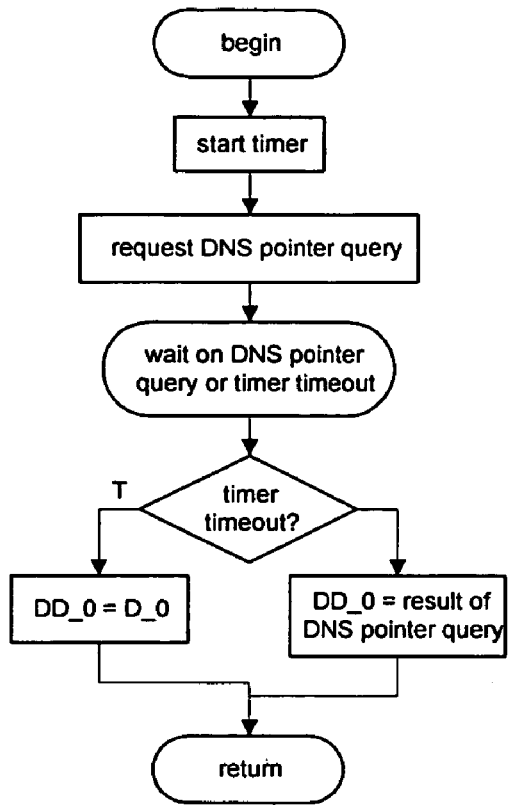
FIG. 9 shows a flowchart for a domain name server (DNS) database server query to fetch the domain name DD_0 associated with a IP address IP_0 of the sending message transfer agent.

The algorithm for requesting the domain name server (DNS) pointer query in FIG. 8A is shown in FIG. 9. The algorithm begins by starting a timer. It then sends out a pointer query to a DNS server to fetch the domain name associated with IP_0. It then waits for either a reply or timer time out. If the timer times out then the real domain DD_0 is set to the declared domain D_0. If the DNS server replies with a domain name and the timer did not time out then the real domain DD_0 is set to the returned domain name. If the DNS reply indicates that it does not have a domain name associated with IP_0 and the timer did not time out then the real domain DD_0 is set to "no name."

Figure 10:
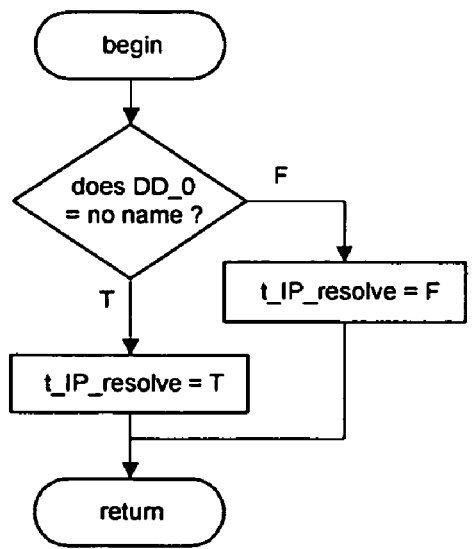
FIG. 10 shows a flowchart for the IP_resolve test which checks if DNS database has a domain name DD_0 associated with IP address IP_0 of the sending message transfer agent.

The algorithm for the IP resolve test in FIG. 8A is shown in FIG. 10. If real domain name DD_0 is "no name" then set flag t_IP_resolve to true, else set flag t_IP_resolve to false. This test is based on the fact that some spammers try to hide their domain name and do not enter a domain name in the DNS database.

Figure 1:
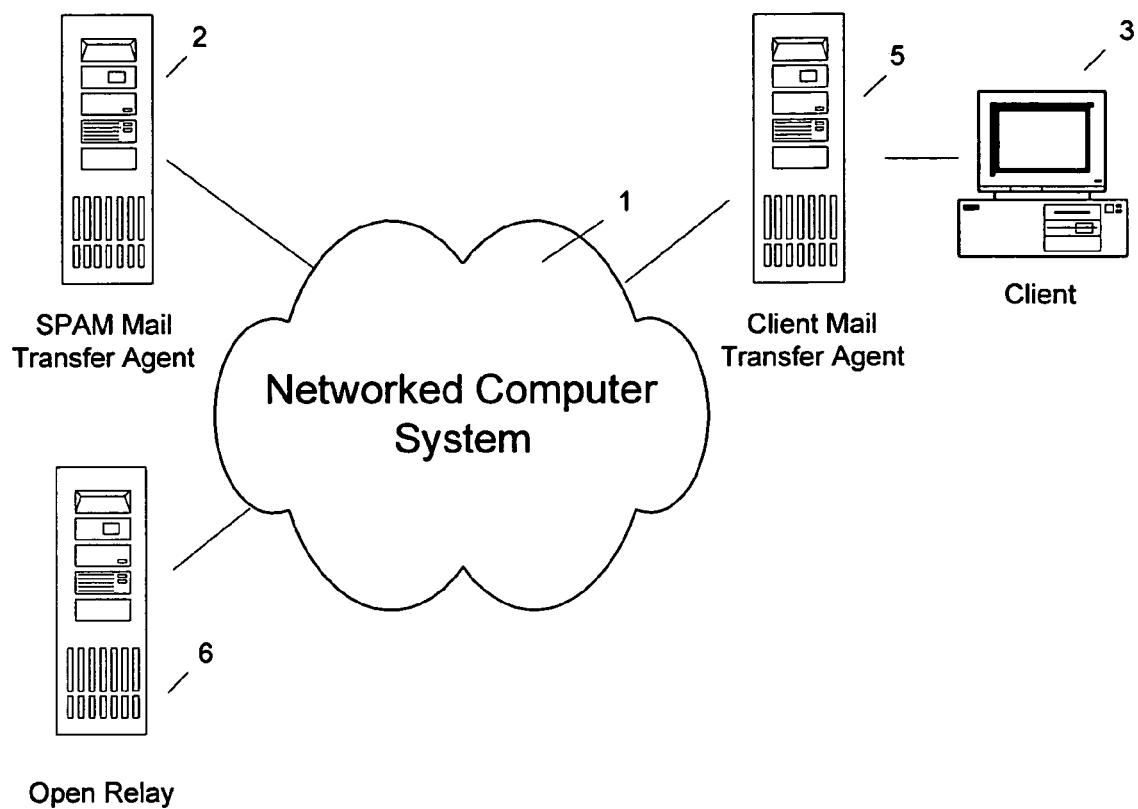
FIG. 1 (prior art) shows a overview block diagram of a networked computer system consisting of a network 1, a client, a transmitting message transfer agent 2, a receiving message transfer agent 5, and a open relay message transfer agent 6.
Figure 11:
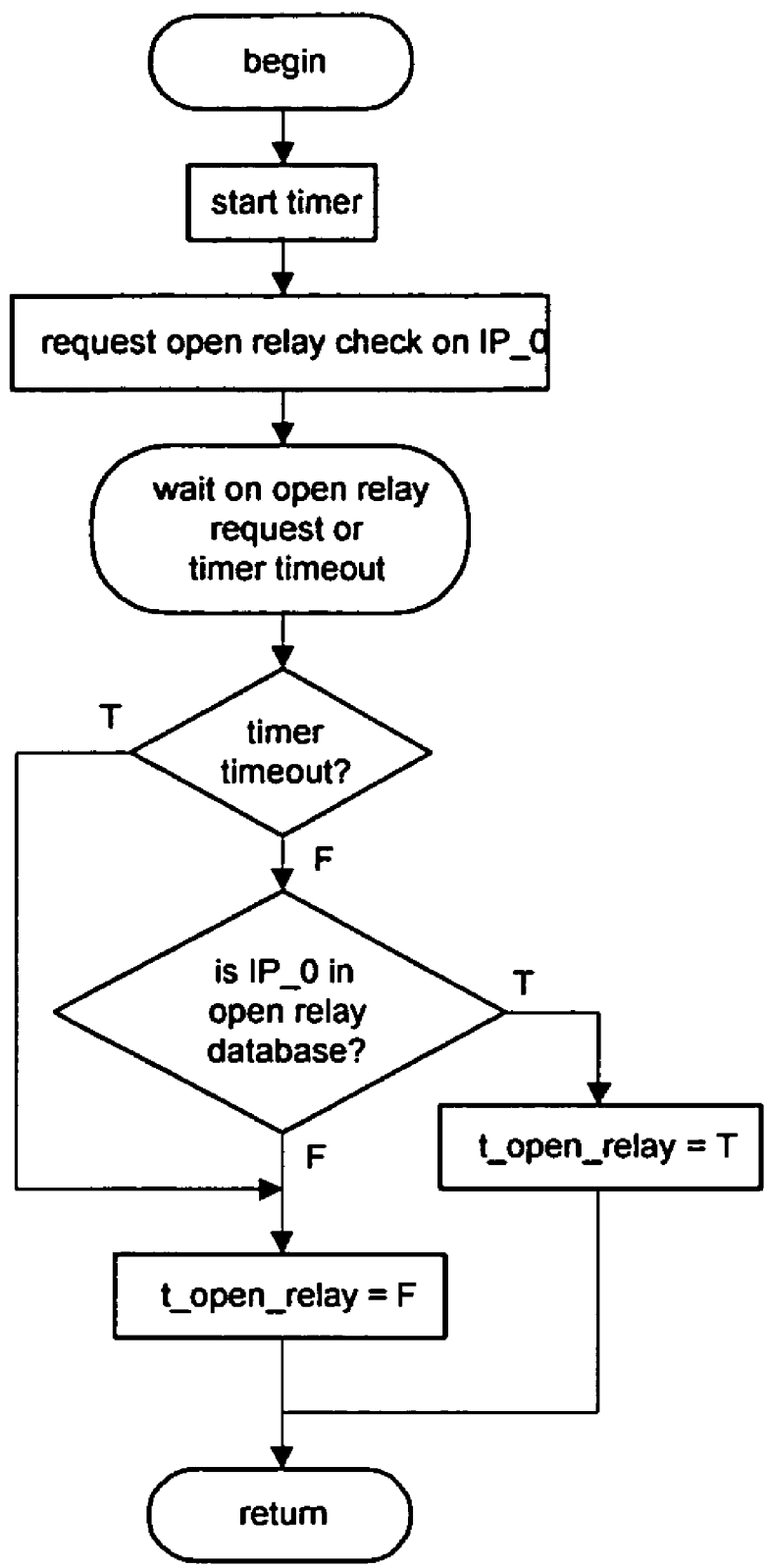
FIG. 11 shows a flowchart for the open_relay test which checks if the IP address IP_0 of the sending message transfer agent is in an open relay database.

The algorithm for the open relay test in FIG. 8A is shown in FIG. 11. The algorithm begins by starting a timer and then checking to see if IP_0 is in an open relay database, such as http://www.relays.ordb.org or http://www.relays.orisrusoft.com. It then waits for either a reply from the open relay database or a timer time out. If the timer does time out then set flag t_open relay to false. If IP_0 is in an open relay database and the timer does not time out then set flag t_open_relay to true, else set flag t_open_relay to false. This test is based on the fact that many spammers try to hide their real IP address by sending their spam to an open relay MTA. This is shown in FIG. 1. The spammer's MTA first sends the unsolicited message to an open relay MTA 6. Open relay MTA 6 then relays the mail to client MTA 5. Client MTA 5 then thinks that it is receiving mail from the open relay MTA 6, rather than spamming MTA 2.

The algorithm for the allow_address test in FIG. 8A is shown in FIG. 12A. If IP_0 is in the allow_address database then set flag t_allow to true, else set flag t_allow to false. The data structure of the allow_address database is shown in FIG. 12B. This database contains the IP address of trusted message transfer agents, such as those associated with AOL, Earthlink, ATT, etc. A sample of some of the allow_address database entries is shown in FIG. 12C.

Figures 13A, 13B, 13C:
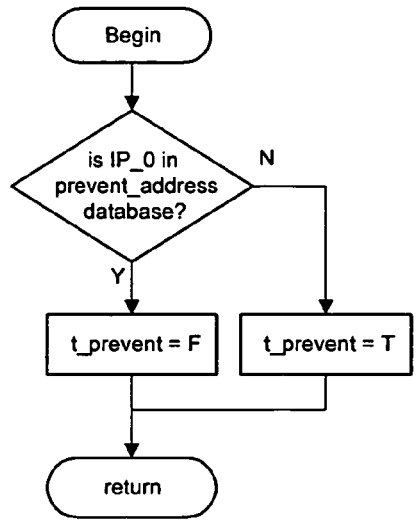
FIG. 13A shows a flowchart for the prevent_address test which checks if the IP address IP_0 of the transmitting message transfer agent is in the prevent_address database.
FIG. 13B shows the data structure of the prevent_address database which stores the IP addresses of known spammers and of dial-in, digital scriber loop, and cable modem accounts from which a legal message transfer agent should not be operating.
FIG. 13C shows a sample of the contents of the prevent_address database.

The algorithm for the prevent_address test in FIG. 8A is shown in FIG. 13A. If IP_0 is in the prevent_address database then set flag t_prevent to true, else set flag t_prevent to false. The data structure of the prevent_address database is shown in FIG. 13B. This database contains the IP address of known spammers. This database also contains MTA's that are not RFC compliant, such as those listed in http://www.rfc.ignorant.org. This database also contains blocks of suspicious IP addresses such as those associated with dial-in, digit scriber loop (DSL), and modem connections since there is no valid reason for a MTA to originate from one of these IP addresses. A sample of some of the prevent_address database entries is shown in FIG. 13C.

Figure 14:
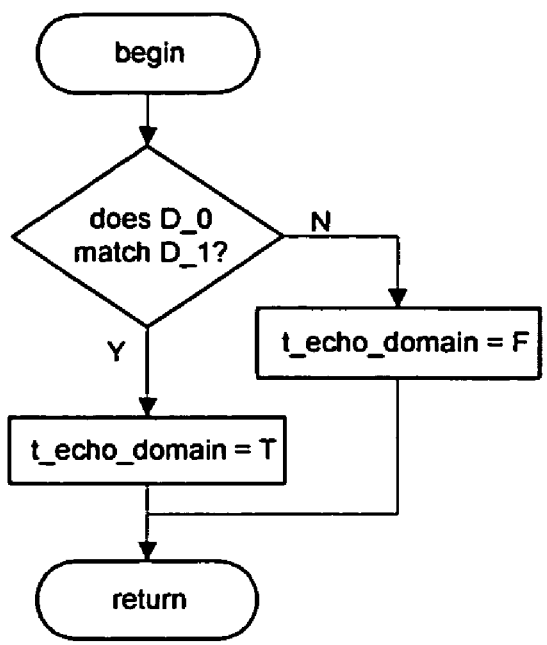
FIG. 14 shows a flowchart for the echo_domain test which checks if the declared domain D_0 matches domain D_1 of the receiving message transfer agent.

The algorithm for the echo_domain test in FIG. 8B is shown in FIG. 14. If declared domain D_0 does match the domain D_1 of MTA_1 then set flag echo domain to true, else set flag echo_domain to false. This test is based on the fact that some spammers set their declared domain to a domain name trusted by MTA_1.

Figure 15:
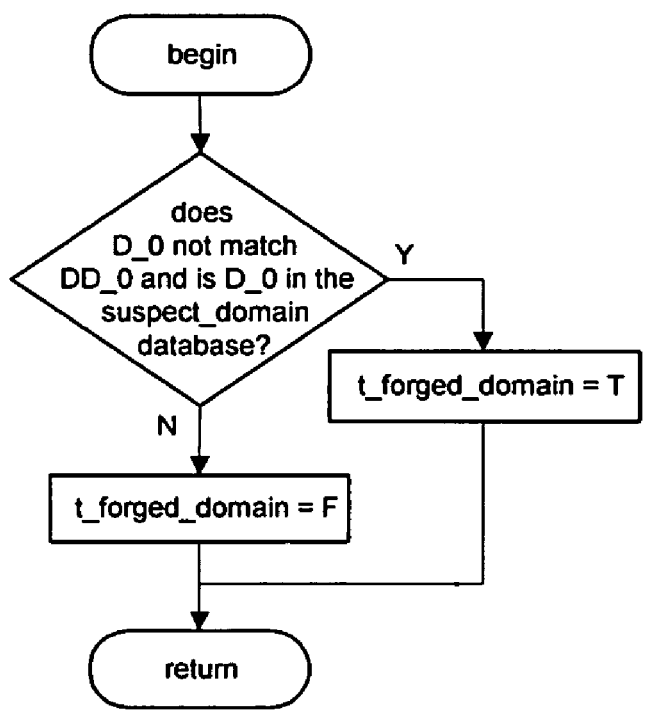
FIG. 15 shows a flowchart for the forged_domain test which checks if the declared domain D_0 does not match the real domain DD_0 of the sending message transfer agent and if the declared domain D_0 of the sending message transfer agent is in the suspect_domain database.

The algorithm for the forged domain test in FIG. 8B is shown in FIG. 15. If the declared domain D_0 does not match the real domain name DD_0 and the declared domain D_0 is in the suspect_domain database then set flag t_forged_domain to true, else set flag t_forged_domain to false. The data structure of the suspect_domain database is shown in FIG. 17B. This test is based on the fact that some spammers hide their true domain name and assume popular domain names such as yahoo.com or hotmail.com however their declared domains D_0 does not match their real domain name DD_0.

The algorithm for the bad_from address test in FIG. 8C is shown in FIG. 16A. If A_0 is in the bad_from database then set flag t_bad_from to true, else set flag t_bad_from to false. This test is based on the fact that some spammers use variations of the same from-address for different spam messages. The data structure of the bad_from database is shown in FIG. 16B. Some examples of bad_from database entries are shown in FIG. 16C. The * symbol indicates at least one wildcard character.

Figure 17A:
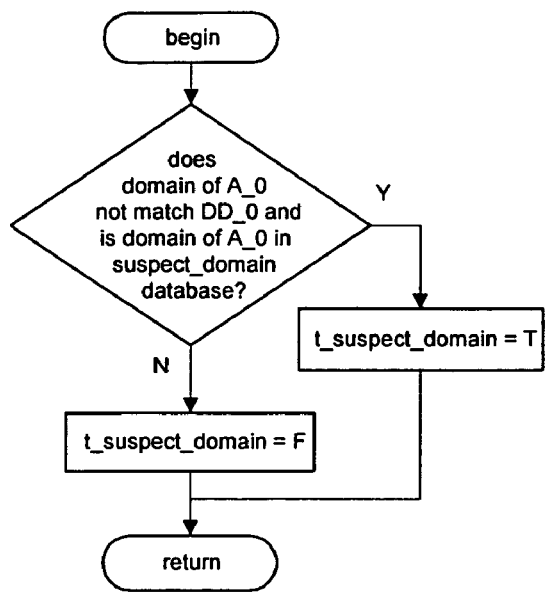
FIG. 17A shows a flowchart for the suspect_domain test which checks if the real domain DD_0 of the sending message transfer agent does not match the domain name of the from-address A_0 and domain of the from-address A_0 is in the suspect_domain database.
Figure 17B:
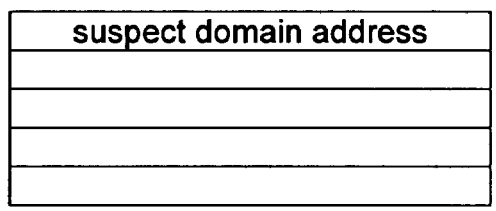
FIG. 17B shows the data structure of the suspect_domain database which stores domain names commonly forged by spammers.

The algorithm for the suspect_domain test in FIG. 8C is shown in FIG. 17A. If the real domain DD_0 does not match the domain of the from-address A_0 and the domain of the from_address A_0 is in the suspect_domain database then set flag t_suspect_domain to true, else set flag t_suspect_domain to false. The data structure of the suspect_domain database is shown in FIG. 17B. This test is based on the fact that some spammers hide their true domain name and assume popular domain names such as yahoo.com or hotmail.com however the domain of their from-address A_0 does not match their real domain name DD_0.

Figure 18:
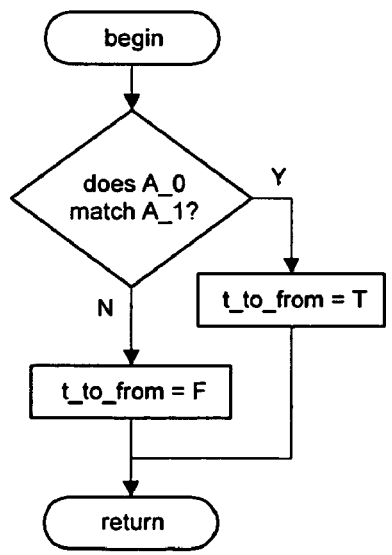
FIG. 18 shows a flowchart for the to_from test which checks if the to-address A_1 of the message matches the from-address.

The algorithm for the to_from test in FIG. 8C is shown in FIG. 18. If from-address A_0 matches to-address A_1 then set flag t_to_from to true, else set flag t_to_from to false. This test is based on the fact that some spammers try to disguise themselves as someone known to MTA_1, such as A_1.

Figure 19A:
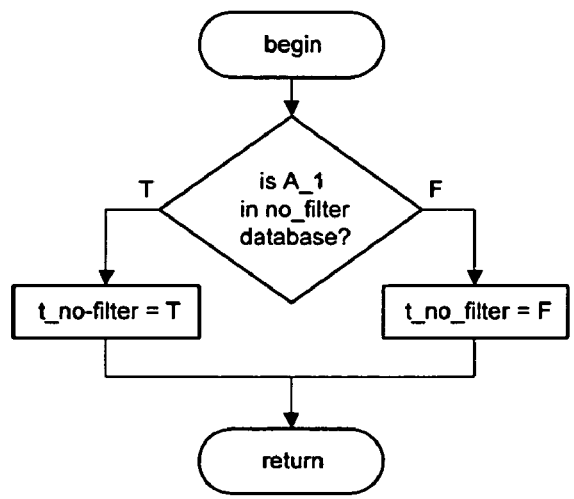
FIG. 19A shows a flowchart for the no_filter test which checks if the to-address A_1 of the message in the no_filter database.
Figure 19B:
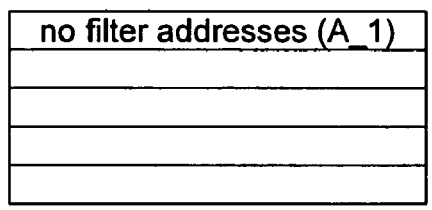
FIG. 19B shows the data structure of the no_filter database which stores the to-addresses A_1 that do not want to be filtered.

The algorithm for the no_filter test in FIG. 8C is shown in FIG. 19A. If to-address A_1 is in the no_filter database then set flag t_no_filter to true, else set flag t_no_filter to false. The data structure of the no_filter database is shown in FIG. 19B. This test is based on the fact that some users do not want their mail filtered.

Figure 20A:
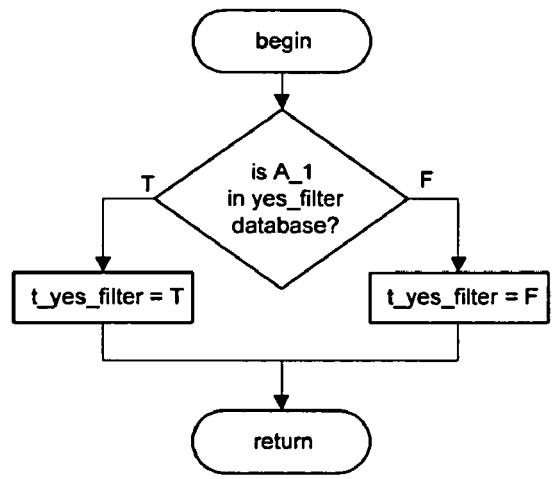
FIG. 20A shows a flowchart for the yes_filter test which checks if the to-address A_1 of the message in the yes_filter database.
Figures 20B, 21A, 21B:
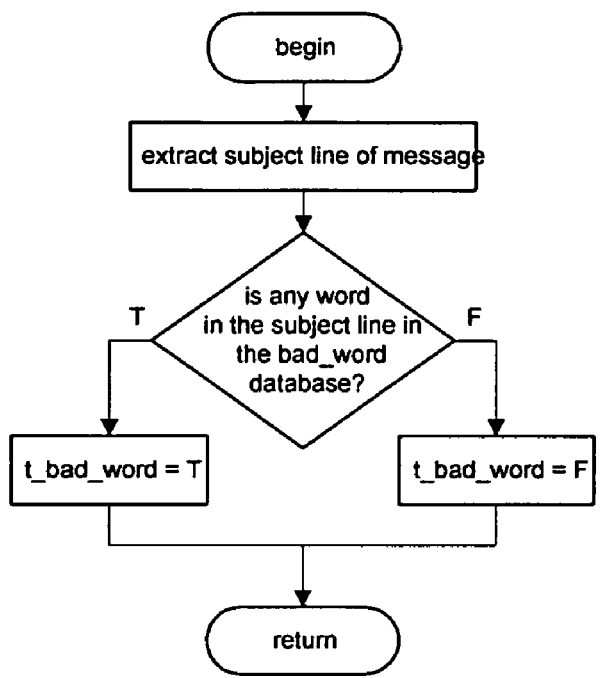
FIG. 20B shows the data structure of the yes_filter database which stores the to-addresses A_1 that do want to be filtered.
FIG. 21A shows a flowchart for the bad_word test which checks if the subject line of the message contains any of the words in the bad_word database.
FIG. 21B shows the data structure of the bad_word database which stores the bad words that are commonly used in the subject line of unsolicited messages.

The algorithm for the yes_filter test in FIG. 8C is shown in FIG. 20A. If to-address A_1 is in the yes_filter database then set flag t_yes_filter to true, else set flag t_yes_filter to false. The data structure of the yes_filter database is shown in FIG. 20B. This test is based on the fact that some users want their mail filtered.

The algorithm for the bad_word test in FIG. 8D is shown in FIG. 21A. The algorithm begins by extracting the subject line from the body of the message. If any word in the subject line is in the bad_word database then set flag t_bad_word to true, else set flag t_bad_word to false. The data structure of the bad_word database is shown in FIG. 21B. This test is based on the fact that some spammers use words such as "porn" or "penis" in the subject line of their messages.

Figure 22A:
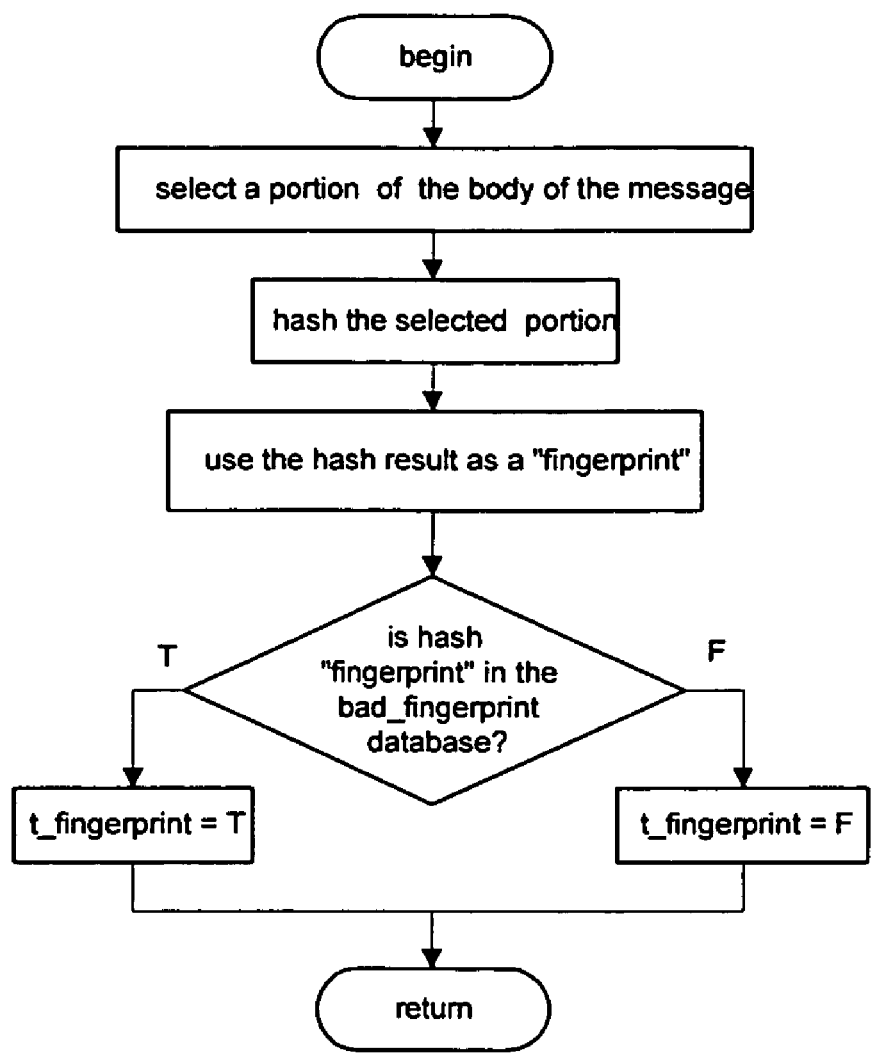
FIG. 22A shows the flowchart for the bad_fingerprint test which checks if the hash "fingerprint" of a portion of the message body is in the bad_fingerprint database.
Figure 22B:
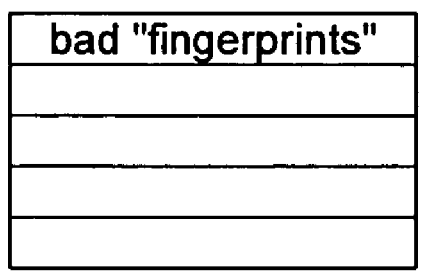
FIG. 22B shows the data structure of the bad_fingerprint database which stores the hash "fingerprints" of portions of various unsolicited messages.

The algorithm for the bad_fingerprint test in FIG. 8D is shown in FIG. 22A. The algorithm begins by selecting a port of the body of the message. It then uses a cryptographic hash function such as MD-5 to compute a "fingerprint" of the message. If the hash "fingerprint" is in the bad_fingerprint database then set flag t_bad_fingerprint to true, else set flag t_bad_fingerprint to false. The data structure of the bad_fingerprint database is shown in FIG. 22B. This test is based on the fact that the message might be a copy of a know spam message.

The spam blocking process can be scaled to handle more messages by deploying more new spam blocking units each connected to a new client message transfer agent and changing the client's MX record to distribute the mail traffic among all the spam blocking units.

The spam blocking process can be made failsafe by deploying more new spam blocking units each connected to a new client message transfer agent and changing the client's MX record to distribute the mail traffic among all the spam blocking units and not to distribute mail traffic to any spam blocking unit which is off-line.

Objectives of this invention are to reduce the communications bandwidth consumed between the client's message transfer agent and mail user agent, to reduce the amount of storage consumed by unsolicited messages, and to eliminate unsolicited messages from a client's e-mail box. This is accomplished by rejecting an unsolicited message before the body of the message is transferred to the client's message transfer agent.

Another objective of this invention is to improve the ability to detect unsolicited messages. This is accomplished by using the sending MTA's IP address, IP_0 which can not be forged. The problem is that content based tests suffer from the fact that the declared domain, from-address, subject line, or message body can easily be forged or changed. IP_0 can not be forged because a forged IP_0 would cause the receiving MTA's 220 rely to be sent to the wrong address and without a 220 reply the sending MTA would never be able to establish the requested connection. Source based tests are thus based on "bedrock" information while content based tests are based on "shifting sands." This improves the ability of the spam blocker to detect suspected unsolicited messages.

Other objectives of this invention are to avoid the need for users to install software on their individual systems and the need to change the client's current message transfer agent. This is accomplished by positioning the spam blocker between the sending and receiving message transfer agents and not between the receiving message transfer agent and the mail user agent. This is further accomplished by not positioning the spam blocker as a message transfer agent add-on or mail user agent add-on. This is further accomplished by keeping the communications between the spam blocker and the sending and receiving message transfer agents standard SMTP protocol and eliminating other in-band or out-of-band communications channels between the spam blocker and the sending message transfer agent, receiving message transfer agent, or the mail user agent.

Another objective of this invention is to log the messages that have been allowed or rejected. This is accomplished by the allow_connection and the rejected_connection databases. This is further accomplished by deferring the decision equation until after the to-address A_1 has been transmitted and captured.

Another objective of this invention is to allow users to select the ability not to block unsolicited messages. This is accomplished by the no_filter test and the no_filter database. A related objective of this invention is to allow users to select the ability to block unsolicited messages. This is accomplished by the yes_filter test and the yes_filter database.

Another objective of this invention is to give feedback to the sender of a blocked message. This is accomplished by the sending a permanent negative completion reply such as a 554 reply to the sending message transfer agent if a message is determined to be unsolicited. The sending message transfer agent will then either send a error message to the sender or send the message back to the message transfer agent that sent the message to the sending message transfer agent. This is important since most spam blocking agents either delete or divert the spam into a junk folder and do not return just an error message. This leaves any sender of a false positive spam message without any knowledge that the message has not been delivered.

The spam blocker algorithm as shown in FIGS. 8A-8E is structured for clarity rather efficiency. It is assumed that anyone skilled in the art can restructure the spam blocker algorithm for efficiency The DNS and open relay database server time out problems can be avoided by setting up a local copies of the servers. All, none or any subset of the tests shown in FIG. 8A can be used in any order at any time before the decision equation shown in FIG. 8D. All, none, or any subset of the tests shown in FIG. 8B can be used in any order at any time before the decision equation shown in FIG. 8D. All, none, or any subset of the tests shown in FIG. 8C can be used in any order at any time before the decision equation shown in FIG. 8D. All, none, or any subset of the test shown in FIG. 8D can be used in any order at any time before the decision equation shown in FIG. 8D. More tests can be added. The decision function has to be modified if any of the tests are not used or more tests are added. While a 554 reply was used to force MTA_0 to QUIT the connection, other 5XX permanent negative completion replies could also be used.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

We claim:

1. A networked computer comprising an unsolicited message rejecting communications processor connected between message transfer agents
   MTA_0 with an Internet address IP_0, a from-address A_0, a declared domain D_0, and a real domain DD_0, and
   MTA_1 with an Internet address IP_1, a domain D_1, and a to-address A_1
comprising:
   a) monitoring means for monitoring the communications between MTA_0 and MTA_1;
   b) determining means for determining if the communications contains a message that is unsolicited;
   c) intercepting means for intercepting a .\r\n end-of-message indicator reply from MTA_0, forcing MTA_0 to QUIT its connection with the unsolicited message rejecting communications processor by sending an error reply to MTA_0 if the message is determined to be unsolicited;
   wherein the unsolicited message rejecting communications processor does not intercept communications between MTA_0 and MTA_1 before a .\r\n end-of-message indicator reply from MTA_0 is received by the unsolicited message rejecting communications processor.

2. The unsolicited message rejecting communications processor in claim 1, further includes an allow_address database and wherein the determining means determines if the message is not unsolicited by checking if the IP_0 is in the allow_address database.

3. The unsolicited message rejecting communications processor in claim 1, further includes a prevent_address database and wherein the determining means determines if the message is unsolicited by checking if IP_0 is in the prevent_address database.

4. The unsolicited message rejecting communications processor in claim 1, further includes access to an open relay database and wherein the determining means determines if the message is unsolicited by checking if IP_0 is in the open relay database.

5. The unsolicited message rejecting communications processor in claim 1, further includes access to a DNS (domain name server) database and wherein the determining means determines if the message is unsolicited by checking if IP_0 has a domain name entry DD_0 in the DNS database.

6. The unsolicited message rejecting communications processor in claim 1, further includes a bad_from database and wherein the determining means determines if the message is unsolicited by checking if the from-address A_0 is in the bad_from database.

7. The unsolicited message rejecting communications processor in claim 1, further includes a suspect_domain database and wherein the determining means determines if the message is unsolicited by checking if the real domain DD_0 matches the domain of the from-address A_0 and the domain of the from-address A_0 is in the suspect_domain database.

8. The unsolicited message rejecting communications processor in claim 1, wherein the determining means determines if the message is unsolicited by checking if the from-address A_0 matches the to-address A_1.

9. The unsolicited message rejecting communications processor in claim 1, further includes a no_filter database and wherein the determining means determines if the message is to be rejected if it is determined to be unsolicited.

10. The unsolicited message rejecting communications processor in claim 1, wherein the determining means determines if the message is unsolicited by checking if the declared domain D_0 is the same as the domain D_1.

11. The unsolicited message rejecting communications processor in claim 1, wherein the determining means determines if the message is unsolicited by checking if the declared domain D_0 does not match the real domain DD_0 and the declared domain D_0 is in the suspect_domain database.

12. The unsolicited message rejecting communications processor in claim 1, further includes a bad_word database and wherein the determining means determines if the message is unsolicited by checking if the subject line of the message contains any words in the bad_word database.

13. The unsolicited message rejecting communications processor in claim 1, further includes a bad_fingerprint database and wherein the determining means determines if the hash "fingerprint" of a portion of the body of the message is in the bad_fingerprint database.

14. The unsolicited message rejecting communications processor in claim 1, further includes a rejected_connection database which logs the time, from-address A_0, to-address A_1, and the reason for the rejection if the message is determined to be unsolicited.

15. The unsolicited message rejecting communications processor in claim 1, further includes an allowed_connection database which logs the time and to-address A_1 if the message is determined not to be unsolicited.

16. A method for
a receiving networked computer with an Internet connection, a message transfer agent MTA_1, an Internet address IP_1, a to-address A_1, and an operating system capable of executing the method
to reject unsolicited messages from
a transmitting networked computer system with an Internet connection and a message transfer agent MTA_0, an Internet address IP_0, a from-address A_0, a declared domain D_0, and a real domain DD_0
comprising the steps of:
a) waiting for a new SMTP connection request;
b) relaying and monitoring the replies from MTA_0 to MTA_1;
c) relaying replies from MTA_1 to MTA_0;
d) intercepting the .\r\n end-of-message indicator reply from MTA_0 to MTA_1;
e) determining if the message is unsolicited by analyzing the monitored replies;
f) releasing the intercepted .\r\n end-of-message reply if the message is determined not to be unsolicited; and
g) sending an error reply to MTA_0 to force MTA_0 and MTA_1 to close down their connection;
whereby MTA_1 controls the interaction between MTA_0 and MTA_1 until a .\r\n end-of-message indicator reply is received from MTA_0.

17. A method for
a receiving networked computer with an Internet connection, a DNS server, and an open relay database, a message transfer agent MTA_1, an IP address IP_1, a domain name D_1, a to-address A_1, an allow_address database, a prevent_address database, a suspect_domain database, a bad_from database, a no_filter database, a yes_filter database, a bad_word database, a bad_fingerprint, a rejected_connection database, an allowed_connection database, and an operating system capable of executing the method
to reject unsolicited messages from
a transmitting networked computer system with an Internet connection, a message transfer agent MTA_0, an IP address IP_0, a declared domain D_0, a real domain DD_0, and a from-address A_0
comprising the steps of:
a) waiting for a SMTP connection request on the receiving networked computer system's Internet connection;
b) sending a 220 reply to MTA_0 to acknowledge the SMTP connection request;
c) extracting the IP address IP_0 from the SMTP connection request;
d) requesting the domain name DD_0 for IP_0 from the DNS server;
e) testing if the domain name DD_0 is "no name";
f) testing if IP_0 is in the open relay database;
g) testing if IP_0 is in the allow_address database;
h) testing if IP_0 is in the prevent_address database;
i) requesting a connection with MTA_1;
j) waiting for a 220 reply from MTA_1 to acknowledge the requested connection;
k) waiting for a reply from either MTA_0 or MTA_1;
l) jumping to step o) if the reply is not from MTA_1;
m) relaying the reply from MTA_1 to MTA_0;
n) jumping to step k) to wait for a new reply;
o) jumping to step u) if the reply from MTA_0 is not a HELO;
p) extracting the declared domain D_0 from the reply;
q) testing if the declared domain D_0 matches the domain D_1;
r) testing if the declared domain D_0 does not match the real domain DD_0 AND the declared domain D_0 is in the suspect_domain database;
s) relaying the HELO reply from MTA_0 to MTA_1;
t) jumping to step k) to wait for a new reply;
u) jumping to step aa) if reply from MTA_0 is not a MAIL;
v) extracting the from-address A_0;
w) testing if A_0 is in the bad_from database;
x) testing if DD_0 does not match the domain of A_0 and the domain of A_0 is in the suspect_domain database;
y) relaying MAIL reply to MTA_1;
z) jumping to step k) to wait for a new reply;
aa) jumping to step ii) if the reply from MTA_0 is not a RCPT;
bb) extracting the to-address A_1;
cc) testing if A_1 is in the no_filter database;
dd) testing if A_0 matches A_1;
ee) testing if A_0 is in the no_filter database;
ff) testing if A_0 is in the yes_filter database;
gg) relaying RCPT reply to MTA_1;
hh) jumping to step k) to wait for a new reply;
ii) jumping to step yy) if the reply from MTA_0 is not DATA;
jj) relaying DATA to MTA_1;
kk) waiting for a 354 reply from MTA_1;
ll) relaying the 354 reply to MTA_0;
mm) wait for the body of the message;
nn) relaying the body of the message to MTA_1;
oo) waiting for a .\r\n end-of-message indicator;
pp) testing if any word in the subject line of the message is in the bad_word database;
qq) testing if the hash "fingerprint" of a portion of the message is in the bad_fingerprint database;
rr) jumping to step vv) if NOT (t_allow OR t_no_filter OR OR NOT t_yes_filter OR NOT (t_prevent OR t_open OR t_DD-) OR t_bad_from OR t_suspect_domain OR t_echo_domain OR t_forged_domain OR t_bad_word OR t_bad_fingerpring));

ss) logging the time and the to-address A_1 in the allowed_connection database;
tt) relaying the .\r\n end-of-message indicator reply to MTA_1 to continue the conversation;
uu) jumping to step k) to wait for a new reply;
vv) logging the time, the from-address A_0, the to-address A_1, and the reason for rejecting the connection in the rejected_connection database;
ww) sending a 554 reply to MTA_0 to terminate the conversation;
xx) jumping to step k) to wait for a new reply;
yy) jumping to step ggg) if the reply from MTA_0 is not RSET, SEND, SOML, SAML, VRFY, NOOP, EXPN, HELP, or TURN;
zz) relaying the reply to MTA_1;
aaa) jumping to step j) to wait for a new reply;
bbb) jumping to step ddd) if the reply from MTA_0 is not a QUIT;
ccc) relaying the QUIT reply to MTA_1;
ddd) waiting for a 221 reply from MTA_1
eee) relaying the 221 reply from MTA_1 to MTA_0;
fff) jumping to step a) to wait for a new connection;
ggg) sending a 500 reply to MTA_0 to signal a syntax error; and
hhh) jumping to step a) to wait for a new connection.

18. A method in a networked computer comprising an unsolicited message rejecting communications processor connected between message transfer agents MTA_0 and MTA_1, said method comprising:

monitoring communications between MTA_0 and MTA_1;

determining if the communications contains a message that is unsolicited; and intercepting a .\r\n end-of-message indicator reply from MTA_0, forcing MTA_0 to QUIT its connection with the unsolicited message rejecting communications processor by sending an error reply to MTA_0 if the message is determined to be unsolicited;

wherein the unsolicited message rejecting communications processor does not intercept communications between MTA_0 and MTA_1 before a .\r\n end-of-message indicator reply from MTA_0 is received by the unsolicited message rejecting communications processor.

* * * * *